J. T. PEDERSEN.
LUBRICATING APPARATUS.
APPLICATION FILED NOV. 17, 1911.
1,112,158.
Patented Sept. 29, 1914.
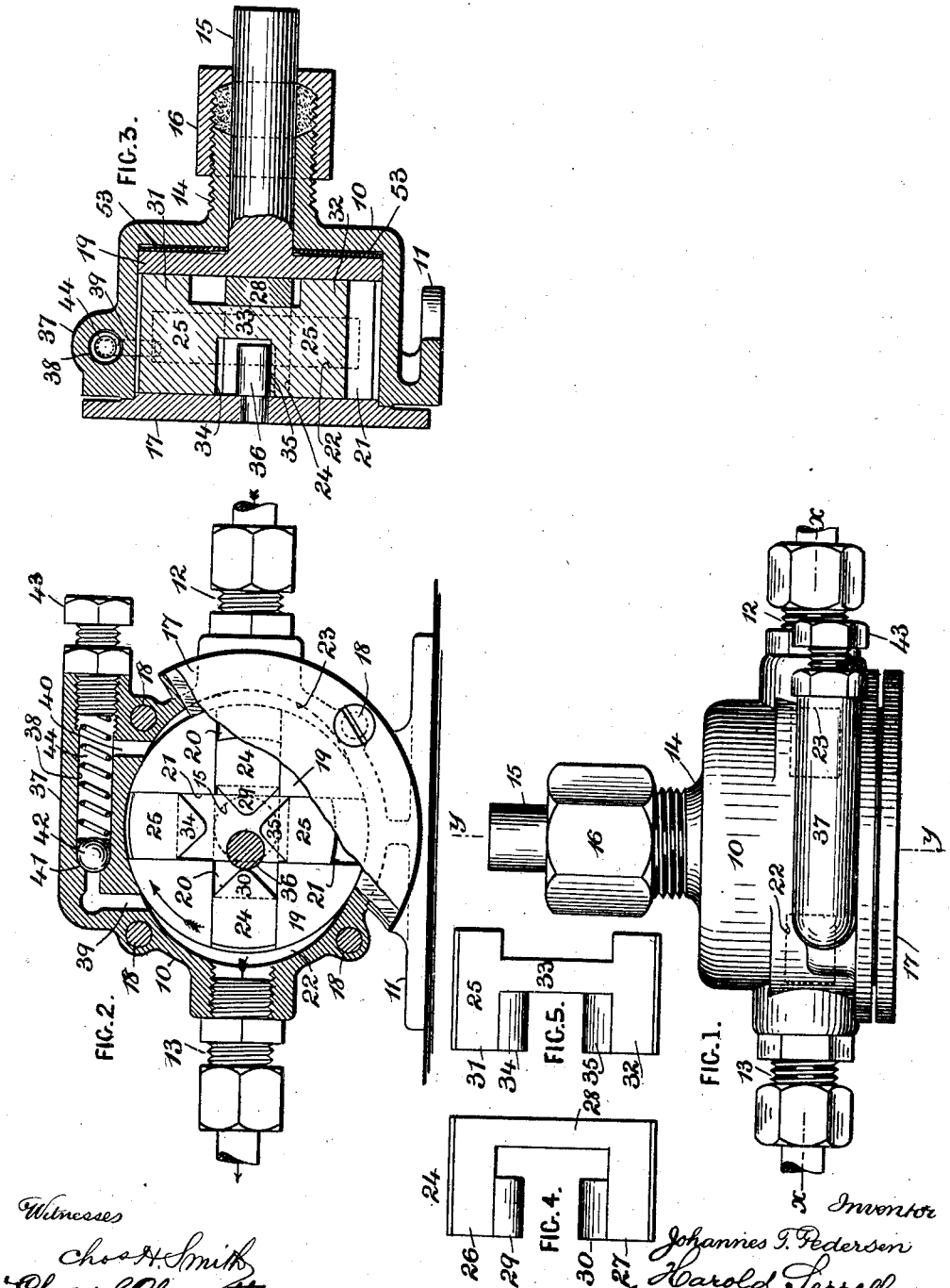

UNITED STATES PATENT OFFICE.

JOHANNES TH. PEDERSEN, OF NEW YORK, N. Y.

LUBRICATING APPARATUS.

1,112,158.   Specification of Letters Patent.   Patented Sept. 29, 1914.

Application filed November 17, 1911. Serial No. 660,756.

*To all whom it may concern:*

Be it known that I, JOHANNES TH. PEDERSEN, a citizen of the United States, residing at Flushing, in the borough of Queens, city and State of New York, have invented an Improvement in Lubricating Apparatus, of which the following is a specification.

My present invention relates to an apparatus adapted for supplying a lubricant to the several parts of a mechanism which may require lubrication, and while the apparatus is adapted for the lubrication of any machine, it is more especially adapted for the lubrication of the running parts of motor vehicles.

The apparatus made in accordance with my present invention is an improvement on the lubricating apparatus shown and described in Letters Patent No. 1,009,562, granted to me November 21, 1911, for Letters Patent for an improvement in lubricating apparatus, and the particular improvements in the present apparatus consist in the provision of a means for returning the lubricant from the discharge end of the pump to the suction or in-take end thereof, automatically, when the volume of oil is reduced to any extent or when for any reason whatsoever the discharge pipes from the pump become clogged or the lubricant in passing through the same meets with undue resistance, with the object of maintaining an even pressure with various adjustable sight feed devices.

Another improvement is that in the present construction, adjacent to both the inlet or suction, and outlet or discharge connections of the pump, the interior space is enlarged so as to be elliptical in cross section, thereby providing pockets between the rotary member and the parts of the casing adjacent to both the inlet and outlet connections; and a still further improvement is the provision of a plurality of independently movable pistons by the use of which the action of one piston is in no wise influenced by that of any other piston, all of which will be hereinafter more particularly described.

In the drawing, Figure 1 is a plan view of my improved lubricating apparatus. Fig. 2 is a sectional elevation on line *x x* Fig. 1. Fig. 3 is a transverse section on line *y y* Fig. 1. Fig. 4 is an elevation of one of the reciprocating pistons, and Fig. 5 is a similar view of another reciprocating piston.

Similar letters and numerals of reference in the several figures indicate similar parts.

Referring to the drawing, and particularly to Figs. 1 to 5, inclusive, the lubricating apparatus comprising my present invention, preferably includes a casing 10 provided with base 11 upon or by means of which the same may be connected to a suitable support. The casing 10 is provided with an inlet or suction connection 12 on one side thereof, and an outlet or discharge connection 13 on the diametrically opposite side thereof. The casing is also provided with a bearing sleeve 14 for a shaft 15, which, as is customary, preferably passes through a gland nut 16 for making a tight joint. On the side of the casing, opposite the bearing sleeve 14, there is provided a cover 17 which may be secured in position by suitable stud bolts 18, or otherwise. Within the casing there is a revoluble head 19 which is integral with or suitably connected to the shaft 15. This revoluble head is provided with a plurality of transverse slide-ways 20 and 21 across in the face of said head, two of these slide-ways being provided in the structure illustrated, but it will be understood that a greater number may be employed if so desired. The opening in the casing which receives the revoluble head 19 is preferably elliptical in cross section, the greater diameter of the ellipse being that extending between the inlet connection 12 and the outlet connection 13, the shorter diameter of this opening in the casing being approximately the same as that of the revoluble head; whereby, as it will be understood, pockets 22 and 23 are provided respectively between the inlet and outlet connections and the revoluble head, these pockets being desirable in order that the oil, or other lubricant may have sufficient space in which to be compressed within the pump, and also that both the in-take and the discharge may be sufficiently free so that there will be adequate time for both of these operations.

24 represents a reciprocating piston adapted to fit and slide within the slide-way 20 in the revoluble head 19, and as is clearly illustrated in the elevation in Fig. 4, this piston consists of two parallel members 26 and 27 connected by a base 28 which bears against the bottom of the slide-way, the member 26 being provided with a tapering lug 29 and the member 27 with a tapering lug 30. The reciprocating piston 25 also consists of two parallel members 31 and 32 connected by a transverse member 33 extend at right angles between them and at a distance from the inner ends of the parallel members 31 and 32, equal, approximately, to the thickness of the base 28 of the reciprocating piston 24. Parallel members 31 and 32 of the reciprocating piston 25 are provided, respectively, with lugs 34 and 35 similar in all respects to the lugs 29 and 30 of the reciprocating piston 24. These pistons extend across one another at right angles and are independently movable. The reciprocating piston 25 is adapted to fit and slide within the slide-way 21 in the revoluble head 19, and in so doing, as will be understood, the inner face of the transverse member 33 of the piston 25 contacts with the outer face of the base 28 of the piston 24.

The cover 17 is provided with a pin 36 which extends inwardly therefrom, and when the cover is in position this pin extends into the union of the slide-ways 20 and 21 between the extremities of the lugs 29 and 30 and 34 and 35 of the reciprocating pistons; the length of the pistons being materially less than the diameter of the revoluble head 19. As will be understood, when the revoluble head is turned by the turning of the shaft, first one piston and then the other will be reciprocated, being drawn from right to left by first one and then the other of its lugs coming into contact with the pin 36, the action being to draw in the lubricant at the suction end of the pump and to discharge the same at the outlet end of the pump, this action being the same as that of the apparatus described in my application aforesaid.

In suitable position between the inlet and outlet connections, the casing is enlarged as indicated at 37 and this enlarged portion of the casing provided with a bore 38. The pocket at the discharge end of the pump is connected with this bore 38 by a passage or port 39 and the bore 38 is connected to the pocket at the inlet end of the pump by a passage 40. At the end of the bore 38 adjacent the passage 39, there is a valve seat 41 adapted to receive the valve 42 which is preferably a ball valve, and also within this bore 38 and extending between the ball valve 42 and an adjusting screw 43 is a spring 44 adapted, as will be understood, to normally maintain the ball valve against its seat, and by adjusting the position of the screw 43 more or less tension may be placed upon the spring 44 to regulate the pressure of the ball valve 42 against its seat 41. It will also be apparent that if from any reason whatsoever the outlet connection or the pipes leading therefrom should become clogged, or partially so, that the ball valve 42 and the passages 39 and 40 and the bore 38 act as a by-pass through which the lubricant is forced from the discharge end of the pump and returned to the suction end thereof, whereby instead of the pump being stopped, the same lubricant is caused to circulate in the casing and head. It will also be understood that while I have illustrated a single discharge connection, I may employ any number of the same or the single discharge connection may supply any desired number of feed pipes, without departing from the nature and spirit of my invention.

I claim as my invention:

1. A lubricating apparatus comprising a casing having inlet and outlet ports, a revoluble head having piston chambers intersecting centrally therein, reciprocating pistons movable one within the other in the said chamber, contact devices connected to the said pistons, and a stationary device engaged by the said contact devices when the revoluble head is turned for successively driving the said pistons only when the piston chambers are open to the said inlet and outlet ports.

2. A lubricating apparatus comprising a casing having inlet and outlet ports, a revoluble head in which there are piston chambers at right angles to each other, a pair of reciprocating pistons operating the one within the other in the said chambers in the revoluble head, and a stationary device engaged by members connected to the said pistons when the revoluble head is turned for successively driving the said pistons only when the piston chambers are open to the said inlet and outlet ports.

3. A lubricating apparatus comprising a casing having inlet and outlet ports, a revoluble head, in the face of which intersecting slide-ways are cut at right angles to each other, a pair of reciprocating pistons adapted to operate, the one within the other, in the said slide-ways, and a fixed pin engaged by members connected to the said pistons when the revoluble head is turned for successively and intermittently driving the said pistons only when the said slide-ways are open to the said inlet and outlet ports.

4. A lubricating apparatus comprising a casing having inlet and outlet connections, a revoluble head in the face of which slide-ways are cut at right angles to each other, a piston having a base, end uprights and lugs extending inwardly therefrom and adapted to operate any one of the said slide-ways, a piston including end uprights, lugs connected thereto, and a connecting member adapted to operate in the other slide-way with the connecting member sliding against the outer surface of the base of the aforesaid piston, and means for engaging the said lugs on the piston for driving the same successively when the said revoluble head is turned.

5. A lubricating apparatus comprising a casing having inlet and outlet connections, a revoluble head in the face of which slideways are cut at right angles to each other, a piston having a base, end uprights and lugs extending inwardly therefrom and adapted to operate in one of the said slideways, a piston including end uprights, lugs connected thereto and a connecting member adapted to operate in the other slide-way with the connecting member sliding against the outer surface of the base of the aforesaid piston, a cover and a pin projecting inwardly therefrom and adapted to engage successively the said lugs on the said piston to drive the same when the said revoluble head is turned.

6. A lubricating apparatus comprising a casing having inlet and outlet connections, a revoluble head in the face of which slideways are cut at right angles to each other, a piston having a base, end uprights and lugs extending inwardly therefrom and adapted to operate in one of the said slideways, a piston including end uprights, lugs connected thereto and a connecting member adapted to operate in the other slide-way with the connecting member sliding against the outer surface of the base of the aforesaid piston, a cover and a pin projecting inwardly therefrom and adapted to engage successively the said lugs on the said piston to drive the same when the said revoluble head is turned, and a by-pass valve with connections thereto and therefrom to the inlet and outlet connections respectively, so that automatically, under certain conditions, the liquid handled by the apparatus may pass from the outlet to the inlet connection thereof.

Signed by me this 14th day of November, 1911.

JOHANNES TH. PEDERSEN.

Witnesses:
  GEO. T. PINCKNEY,
  BERTHA M. ALLEN.